(12) United States Patent
Hwang et al.

(10) Patent No.: US 10,889,175 B1
(45) Date of Patent: Jan. 12, 2021

(54) POWER TRANSMISSION APPARATUS OF HYBRID ELECTRIC VEHICLE

(71) Applicants: HYUNDAI MOTOR COMPANY, Seoul (KR); KIA MOTORS CORPORATION, Seoul (KR)

(72) Inventors: Seong Wook Hwang, Gunpo-si (KR); Soonki Eo, Ansan-si (KR); Ilhan Yoo, Hwaseong-si (KR); Dongwoo Kim, Incheon (KR); Yong Sug Choi, Hwaseong-si (KR); Jong Hyo Park, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/890,605

(22) Filed: Jun. 2, 2020

(30) Foreign Application Priority Data

Dec. 6, 2019 (KR) .......................... 10-2019-0161904

(51) Int. Cl.
*B60K 6/365* (2007.10)
*F16H 3/66* (2006.01)
(Continued)

(52) U.S. Cl.
CPC ................ *B60K 6/365* (2013.01); *B60K 6/38* (2013.01); *F16H 3/666* (2013.01); *F16H 3/725* (2013.01); *B60Y 2200/92* (2013.01); *F16H 2200/0021* (2013.01); *F16H 2200/0039* (2013.01); *F16H 2200/0052* (2013.01); *F16H 2200/2007* (2013.01); *F16H 2200/2041* (2013.01);
(Continued)

(58) Field of Classification Search
CPC ...... B60K 6/365; B60K 6/38; B60Y 2200/92; F16H 3/666; F16H 3/663; F16H 3/725; F16H 2200/0021; F16H 2200/0039; F16H 2200/0052; F16H 2200/0069; F16H 2200/2007; F16H 2200/2064; F16H 2200/2094; F16H 2200/2041
See application file for complete search history.

(56) References Cited

U.S. PATENT DOCUMENTS 9,340,101 B2 * 5/2016 Meißner ................. F16H 3/725
2007/0072724 A1 * 3/2007 Raghavan ................ B60K 6/40
475/5
(Continued)

*Primary Examiner* — Charles A Fox
*Assistant Examiner* — Lori Wu
(74) *Attorney, Agent, or Firm* — Brinks Gilson & Lione

(57) ABSTRACT

A power transmission apparatus for a vehicle includes: an input shaft receiving engine torque; a compound planetary gear set formed by first and second planetary gear sets and having first to fifth elements; a first shaft fixedly connected to the first element, fixedly connected to a motor/generator, and selectively connected to the input shaft; a second shaft fixedly connected to the second element and selectively connected to the input shaft; a third shaft fixedly connected to the third element and selectively connected to a housing; a fourth shaft fixedly connected to the fourth element, fifth shaft fixedly connecting the fifth element and an output gear; a sixth shaft selectively connected to the second shaft and the fourth shaft and selectively connected to the housing; engagement elements including a clutch and a brake; and an engagement unit selectively connecting the sixth shaft to the second shaft or the fourth shaft.

7 Claims, 2 Drawing Sheets

(51) Int. Cl.
*F16H 3/72* (2006.01)
*B60K 6/38* (2007.10)

(52) U.S. Cl.
CPC ............... *F16H 2200/2064* (2013.01); *F16H 2200/2094* (2013.01)

(56) References Cited

U.S. PATENT DOCUMENTS

| | | | | |
|---|---|---|---|---|
| 2007/0072725 | A1* | 3/2007 | Bucknor | F16H 3/728 475/5 |
| 2007/0105678 | A1* | 5/2007 | Bucknor | B60L 50/16 475/5 |
| 2018/0363737 | A1* | 12/2018 | Kook | F16H 3/66 |
| 2019/0078665 | A1* | 3/2019 | Beck | F16H 3/66 |

* cited by examiner

FIG. 2

| Mode | Shift-stage | C1 | C2 | B1 | B2 | CG G2 | CG G4 |
|---|---|---|---|---|---|---|---|
| Engine mode (parallel hybrid mode) | D1 | ● | | ● | | ● | |
| | D2 | ● | | | ● | | |
| | D3 | ● | | ● | | | ● |
| | D4 | ● | | | | | |
| | D5 | | ● | ● | | | ● |
| | D6 | | ● | | ● | | |
| eCVT mode | | | ● | | | | |
| EV mode | D1 | | | ● | | ● | |
| | D2 | | | | ● | | |
| | D3 | | | ● | | | ● |

POWER TRANSMISSION APPARATUS OF HYBRID ELECTRIC VEHICLE

CROSS-REFERENCE TO RELATED APPLICATION

This application claims priority to and the benefit of Korean Patent Application No. 10-2019-0161904, filed on Dec. 6, 2019, the entire contents of which are incorporated herein by reference.

FIELD

The present disclosure relates to a power transmission apparatus of a hybrid electric vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to achieve environmental and fuel efficiency regulations.

Therefore, car makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electric energy are mixed and used as the power sources.

In the hybrid electric vehicle, an EV mode in which the hybrid electric vehicle is driven by only the motor, an HEV mode using both the engine and the motor, and an ENG mode using only the engine can be implemented according to the combination of the engine and the motor. Further, the hybrid electric vehicle can provide a significant improvement of fuel efficiency through an idle stop function of stopping the engine when the vehicle stops, and also through a regenerative braking, where a motor/generator is driven as a generator to generate electricity by a kinetic energy of the vehicle under a braking situation, such generated electricity is stored in a battery, and the stored electricity is reused in driving the vehicle.

A transmission for hybrid electric vehicle performs shifting operation based on torques of the engine and the motor/generator. Such a transmission may realize multi-speed, e.g., six speeds, of various modes by additionally employing an engine clutch to be variably connected to the engine to a traditional multi-speed, e.g., six-speed, automatic transmission.

Such a transmission for a hybrid electric vehicle may typically include three planetary gear sets, six operational elements, and at least one one-way clutch OWC, similarly to a conventional six-speed automatic transmission, as well as the additional engine clutch. By such a scheme, the transmission for a hybrid electric vehicle may not be understood to be best optimized for a hybrid electric vehicle, and may be improved to provide better efficiency, better performance, and better fuel consumption, and/or less production cost.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus of a hybrid electric vehicle having advantages of, while simplifying the structure of a transmission, realizing various shifting modes, such as an engine mode and a parallel hybrid mode respectively having multiple speeds, an electronically-controlled continuously variable shifting mode (eCVT mode), and an electric vehicle mode (EV mode), thereby reducing a production cost, and realizing fuel consumption characteristic and power performance above an equivalent transmission.

An exemplary power transmission apparatus is for a hybrid electric vehicle having power sources of an engine and a motor/generator. The power transmission apparatus may include: an input shaft receiving an engine torque; a compound planetary gear set formed by a combination of a first planetary gear set and a second planetary gear set and having first, second, third, fourth, and fifth rotation elements; a first shaft fixedly connected to the first rotation element, fixedly connected to the motor/generator, and selectively connected to the input shaft; a second shaft fixedly connected to the second rotation element and selectively connected to the input shaft; a third shaft fixedly connected to the third rotation element and selectively connected to a transmission housing; a fourth shaft fixedly connected to the fourth rotation element; a fifth shaft fixedly connecting the fifth rotation element and an output gear; a sixth shaft selectively connected to the second shaft and the fourth shaft and selectively connected to the transmission housing; a plurality of engagement elements including at least one clutch and at least one brake; and an engagement unit selectively connecting the sixth shaft to the second shaft or the fourth shaft.

In one form, the first planetary gear set is formed as a single pinion planetary gear set and the second planetary gear set is formed as a double pinion planetary gear set.

In another form, the compound planetary gear set may include a first sun gear as the first rotation element, a common planet carrier as the second rotation element, a first ring gear as the third rotation element, a second sun gear as the fourth rotation element, and a second ring gear as the fifth rotation element. In particular, the first and second planetary gear sets share the common planet carrier.

In another form, the plurality of engagement elements may include: a first clutch arranged between the first shaft and the input shaft, a second clutch arranged between the second shaft and the input shaft, a first brake arranged between the sixth shaft and the transmission housing, and a second brake arranged between the third shaft and the transmission housing.

In other form, the engagement unit may include a dog clutch unit. The dog clutch unit may include: a sixth shaft gear formed on an interior circumference of the sixth shaft, a second shaft gear formed on an exterior circumference of the second shaft, a fourth shaft gear formed on an exterior circumference of the fourth shaft, and a clutch gear that has an exterior circumference always engaged with the sixth shaft gear, and an interior circumference selectively engaged with the second shaft gear and the fourth shaft gear such that the clutch gear selectively connects the sixth shaft to the second shaft or the fourth shaft.

The power transmission apparatus of a hybrid electric vehicle may realize an engine mode and a parallel hybrid mode respectively having six fixed shift-stages, an electronically-controlled continuously variable shifting mode, and an electric vehicle mode having three fixed shift-stages.

According to a power transmission apparatus of a hybrid electric vehicle according to an exemplary form, while simplifying the structure of a transmission by employing only two planetary gear sets, various shifting modes, such as an engine mode and a parallel hybrid mode respectively having six speeds, an electronically-controlled continuously variable shifting mode (eCVT mode), and an electric vehicle mode (EV mode) having three speeds, may be realized, thereby reducing a production cost and realizing fuel consumption characteristic and power performance above an equivalent transmission.

In addition, the number of employed planetary gear sets may be decreased compared to a conventional six-speed transmission, and therefore, an overall length may be decreased, thereby improving installability.

In addition, by applying the dog clutch unit, the number of unengaged wet-type clutches is decreased to improve power delivery efficiency, and simultaneously, an eCVT mode having gear ratios appropriate for a low gear may be realized, and fuel consumption may be improved by using the eCVT mode when driving in a city-mode.

In addition, by controlling a brake through the dog clutch unit, a drag loss of the brake may be prevented by utilizing a neutral state of the dog clutch unit.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart of a power transmission apparatus of a hybrid electric vehicle according to an exemplary form of the present disclosure.

Figure 1:
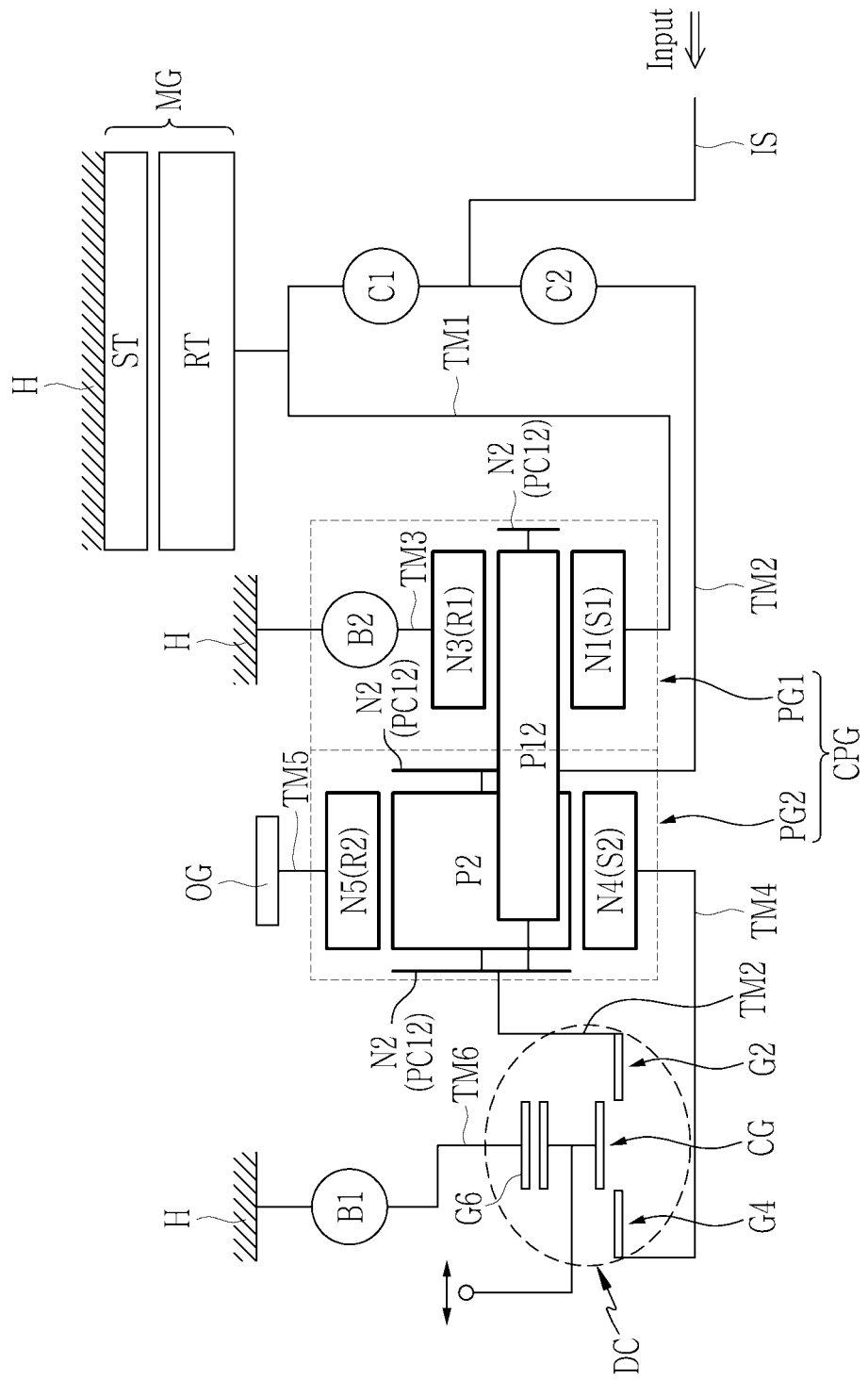
FIG. 1 is schematic diagram of a power transmission apparatus of a hybrid electric vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is schematic diagram of a power transmission apparatus of a hybrid electric vehicle according to an exemplary form of the present disclosure.

Referring to FIG. 1, the power transmission apparatus of a hybrid electric vehicle receives torques from power sources of an engine ENG and a motor/generator MG, and includes: an input shaft IS, a compound planetary gear set CPG for shifting torques of the engine ENG and the motor/generator MG received from the input shaft IS into six fixed shift-stages and outputting a shifted torque through an output gear OG, six shafts TM1 to TM6, a plurality of engagement elements, and an engagement unit.

The torque of the engine ENG is always input to the input shaft IS.

The engine ENG is a primary power source, and may be implemented as one of various types such as a gasoline engine or a diesel engine.

The motor/generator MG is fixedly connected to the planetary gear set portion PG and is used as an auxiliary power source.

The motor/generator MG may act as a motor and also as a generator, and includes a stator ST and a rotor RT, where the stator ST is fixed to a transmission housing H, and the rotor RT is disposed within the stator ST and rotatable relatively to the stator ST.

The compound planetary gear set CPG is formed to share a planet carrier, by a combination of a single pinion planetary gear set of a first planetary gear set PG1 and a double pinion planetary gear set of a second planetary gear set PG2.

That is, the compound planetary gear set CPG is formed by a combination of the first and second planetary gear sets PG1 and PG2 having a common planet carrier PC12, and thereby forms first, second, third, fourth, and fifth rotation elements N1, N2, N3, N4, and N5.

The first rotation element N1 is formed by a first sun gear S1. The second rotation element N2 is formed by a common planet carrier PC12. The third rotation element N3 is formed by a first ring gear R1. The fourth rotation element N4 is formed by a second sun gear S2. The fifth rotation element N5 is formed by a second ring gear R2.

In addition, six shafts TM1 to TM6 are connected to the compound planetary gear set CPG, as follows.

The first shaft TM1 is fixedly connected to the first rotation element N1 (first sun gear S1), fixedly connected to the motor/generator MG, and selectively connected to the input shaft IS.

That is, the first shaft TM1 always acts as an input element by always receiving the torque of the motor/generator MG and also by selectively receiving the torque of the input shaft IS.

The second shaft TM2 is fixedly connected to the second rotation element (N2; common planet carrier PC12), and selectively connected to the input shaft IS, thereby selectively acting as an input element.

The third shaft TM3 is fixedly connected to the third rotation element N3 (first ring gear R1), and selectively connected to the transmission housing H, thereby selectively acting as a fixed element.

The fourth shaft TM4 is fixedly connected to the fourth rotation element N4 (second sun gear S2).

The fifth shaft TM5 is fixedly connected to the fifth rotation element N5 (second ring gear R2), and fixedly connected to the output gear OG, thereby always acting as an output element.

The sixth shaft TM6 is selectively connected to the second shaft TM2 and the fourth shaft TM4, and selectively connected to the transmission housing H so as to selectively act as a fixed element together with either one of the second shaft TM2 and the fourth shaft TM4.

In the disclosure, when two or more members are described to be "fixedly connected", where each of the members may be any of a shaft, an input shaft, an output shaft, a rotational member, and a transmission housing, it means that the fixedly connected members always rotate at a same speed.

When two or more members are described to be "selectively connected" by an engagement element, it means that the selectively connected members rotates separately when the engagement element is not engaged, and rotates at a same speed when the engagement element is engaged.

It may be understood that in the case that a member is "selectively connected" to a transmission housing by an engagement element, the member may be stationary when the engagement element is engaged.

Engagement elements of first and second clutches C1 and C2 and a dog clutch unit DC are disposed between a corresponding pair of the six shafts TM1 to TM6 and the input shaft, so as to form selective connections Engagement elements of first and second brakes B1 and B2 are disposed between the transmission housing H and a corresponding shaft of the six shafts TM1 to TM6, so as to form selective connections The four engagement elements of the two clutches C1 and C2 and the two brakes B1 and B2 are disposed as follows.

The first clutch C1 is disposed between the first shaft TM1 and the input shaft IS, and selectively connects the first shaft TM1 and the input shaft IS, thereby controlling power delivery therebetween.

The second clutch C2 is disposed between the second shaft TM2 and the input shaft IS, and selectively connects the second shaft TM2 and the input shaft IS, thereby controlling power delivery therebetween.

The first brake B1 is disposed between the sixth shaft TM6 and the transmission housing H, and selectively connects the sixth shaft TM6 to the transmission housing H.

The second brake B2 is disposed between the third shaft TM3 and the transmission housing H, and selectively connects the third shaft TM3 to the transmission housing H.

The engagement elements of the first and second clutches C1 and C2 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

The dog clutch unit DC includes a sixth shaft gear G6 formed on an interior circumference of the sixth shaft TM6, a second shaft gear G2 formed on an exterior circumference of the second shaft TM2, a fourth shaft gear G4 formed on an exterior circumference of the fourth shaft TM4, and a clutch gear disposed between the three gears G6, G2, and G4.

An exterior circumference of the clutch gear CG is always engaged with sixth shaft gear G6, and may move in an axial direction (left and right in the drawing) by an external actuator (not shown) or by a piston driven by internal hydraulic pressure. By such an axial movement, an interior circumference of the clutch gear CG may selectively engaged with one of the second shaft gear G2 and the fourth shaft gear G4, so as to selectively connect the sixth shaft TM6 to the one of the second shaft TM2 and the fourth shaft TM4.

FIG. 2 is an operational chart of a power transmission apparatus of a hybrid electric vehicle according to an exemplary form of the present disclosure.

Referring to FIG. 2, the power transmission apparatus of a hybrid electric vehicle achieves an engine mode (parallel hybrid mode) having six fixed shift-stages, an EV mode having three fixed shift-stages, and an eCVT mode enabling electronically-controlled continuously variable shifting.

Hereinafter, an operation of a power transmission apparatus for a hybrid electric vehicle according to an exemplary form is described in detail in connection with respective modes.

[Engine Mode Forward First Speed (Parallel Hybrid Mode Forward First Speed)]

In an engine mode forward first speed, the engine ENG is operated, the clutch gear CG of the dog clutch unit DC interconnects the sixth shaft gear G6 and the second shaft gear G2, and the first clutch C1 and the first brake B1 are simultaneously operated.

Then, since the first brake B1 is operated and the clutch gear CG of the dog clutch unit DC interconnects the sixth shaft gear G6 and the second shaft gear G2, the second shaft TM2 of the compound planetary gear set CPG acts as a fixed element. In this state, by the operation of the first clutch C1, the torque of the engine ENG is input to the first rotation element N1 through the first shaft TM1.

As a result, a reduced speed output is delivered to the fifth rotation element N5 of the compound planetary gear set CPG, and the torque of the engine mode forward first speed is output through the output gear OG connected to the fifth rotation element N5 through the fifth shaft TM5.

Here, when the motor/generator MG is driven, the torque of the motor/generator MG is added to the first shaft TM1, and therefore, a parallel hybrid mode forward first speed may be realized.

[Engine Mode Forward Second Speed (Parallel Hybrid Mode Forward Second Speed)]

In an engine mode forward second speed, the engine ENG is operated, and the first clutch C1 and the second brake B2 are simultaneously operated.

Then, the third shaft TM3 of the compound planetary gear set CPG acts as a fixed element by the operation of the second brake B2. In this state, by the operation of the first clutch C1, the torque of the engine ENG is input to the first rotation element N1 through the first shaft TM1.

As a result, a reduced speed output is delivered to the fifth rotation element N5 of the compound planetary gear set CPG, and the torque of the engine mode forward second speed is output through the output gear OG connected to the fifth rotation element N5 through the fifth shaft TM5.

Here, when the motor/generator MG is driven, the torque of the motor/generator MG is added to the first shaft TM1, and therefore, a hybrid mode forward second speed may be realized.

[Engine Mode Forward Third Speed (Parallel Hybrid Mode Forward Third Speed)]

In an engine mode forward third speed, the engine ENG is operated, the clutch gear CG of the dog clutch unit DC interconnects the sixth shaft gear G6 and the fourth shaft gear G4, and the first clutch C1 and the first brake B1 are simultaneously operated.

Then, since the first brake B1 is operated and the clutch gear CG of the dog clutch unit DC interconnects the sixth shaft gear G6 and the fourth shaft gear G4, the fourth shaft TM4 of the compound planetary gear set CPG acts as a fixed element. In this state, by the operation of the first clutch C1, the torque of the engine ENG is input to the first rotation element N1 through the first shaft TM1.

As a result, a reduced speed output is delivered to the fifth rotation element N5 of the compound planetary gear set CPG, and the torque of the engine mode forward third speed is output through the output gear OG connected to the fifth rotation element N5 through the fifth shaft TM5.

Here, when the motor/generator MG is driven, the torque of the motor/generator MG is added to the first shaft TM1, and therefore, a parallel hybrid mode forward third speed may be realized.

[Engine Mode Forward Fourth Speed (Parallel Hybrid Mode Forward Fourth Speed)]

In an engine mode forward fourth speed, the engine ENG is operated, and the first and second clutches C1 and C2 are simultaneously operated.

Then, by the operation of the first and second clutches C1 and C2, the torque of the engine ENG is simultaneously input to the first and second rotation elements N1 and N2 of compound planetary gear set CPG through the first shaft TM1 and the second shaft TM2.

As a result, the compound planetary gear set CPG integrally rotates, and therefore, an input torque forms the torque of the engine mode forward fourth speed and is directly output through the output gear OG connected to the fifth rotation element N5 through the fifth shaft TM5.

Here, when the motor/generator MG is driven, the torque of the motor/generator MG is added to the first shaft TM1, and therefore, a hybrid mode forward fourth speed may be realized.

[Engine Mode Forward Fifth Speed (Parallel Hybrid Mode Forward Fifth Speed)]

In an engine mode forward fifth speed, the engine ENG is operated, the clutch gear CG of the dog clutch unit DC interconnects the sixth shaft gear G6 and the fourth shaft gear G4, and the second clutch C2 and the first brake B1 are simultaneously operated.

Then, since the first brake B1 is operated and the clutch gear CG of the dog clutch unit DC interconnects the sixth shaft gear G6 and the fourth shaft gear G4, the fourth shaft TM4 of the compound planetary gear set CPG acts as a fixed element. In this state, by the operation of the second clutch C2, the torque of the engine ENG is input to the second rotation element N2 through the second shaft TM2.

As a result, an increased speed output is delivered to the fifth rotation element N5 of the compound planetary gear set CPG, and the torque of the engine mode forward fifth speed is output through the output gear OG connected to the fifth rotation element N5 through the fifth shaft TM5.

Here, when the motor/generator MG is driven, the torque of the motor/generator MG is added to the first shaft TM1, and therefore, a parallel hybrid mode forward fifth speed may be realized.

[Engine Mode Forward Sixth Speed (Parallel Hybrid Mode Forward Sixth Speed)]

In an engine mode forward sixth speed, the engine ENG is operated, and the second clutch C2 and the second brake B2 are simultaneously operated.

Then, the third shaft TM3 of the compound planetary gear set CPG acts as a fixed element by the operation of the second brake B2. In this state, by the operation of the second clutch C2, the torque of the engine ENG is input to the second rotation element N2 through the second shaft TM2.

As a result, an increased speed output is delivered to the fifth rotation element N5 of the compound planetary gear set CPG, and the torque of the engine mode forward sixth speed is output through the output gear OG connected to the fifth rotation element N5 through the fifth shaft TM5.

Here, when the motor/generator MG is driven, the torque of the motor/generator MG is added to the first shaft TM1, and therefore, a hybrid mode forward sixth speed may be realized.

[eCVT Mode]

In the eCVT mode, while the engine ENG is operated at a fixed rotation speed, the motor/generator MG is operated and the second clutch C2 is engaged.

Then, the torque of the engine ENG is transmitted to the second rotation element N2 through the second shaft TM2 by the operation of the second clutch C2, and simultaneously, the torque of the motor/generator MG is input to the first rotation element N1 through the first shaft TM1.

In this state, by varying the rotation speed of the motor/generator MG, an appropriate gear ratio may be achieved, which may be called an eCVT mode.

[EV Mode First Speed]

In an EV mode first speed, the motor/generator MG is operated, the clutch gear CG of the dog clutch unit DC interconnects the sixth shaft gear G6 and the second shaft gear G2, and the first brake B1 is engaged.

Then, since the first brake B1 is operated and the clutch gear CG of the dog clutch unit DC interconnects the sixth shaft gear G6 and the second shaft gear G2, the second shaft TM2 of the compound planetary gear set CPG acts as a fixed element. In this state, the torque of the motor/generator MG is input to the first rotation element N1 through the first shaft TM.

As a result, a reduced speed output is delivered to the fifth rotation element N5 of the compound planetary gear set CPG, and the torque of the EV mode first speed is output through the output gear OG connected to the fifth rotation element N5 through the fifth shaft TM5.

[EV Mode Second Speed]

In an EV mode second speed, the motor/generator MG is operated, and the second brake B2 is engaged.

Then, the third shaft TM3 of the compound planetary gear set CPG acts as a fixed element by the operation of the second brake B2. In this state, the torque of the motor/generator MG is input to the first rotation element N1 through the first shaft TM.

As a result, a reduced speed output is delivered to the fifth rotation element N5 of the compound planetary gear set CPG, and the torque of the EV mode second speed is output through the output gear OG connected to the fifth rotation element N5 through the fifth shaft TM5.

[EV Mode Third Speed]

In an EV mode third speed, the motor/generator MG is operated, the clutch gear CG of the dog clutch unit DC interconnects the sixth shaft gear G6 and the fourth shaft gear G4, and the first brake B1 is engaged.

Then, since the first brake B1 is operated and the clutch gear CG of the dog clutch unit DC interconnects the sixth shaft gear G6 and the fourth shaft gear G4, the fourth shaft TM4 of the compound planetary gear set CPG acts as a fixed element. In this state, the torque of the motor/generator MG is input to the first rotation element N1 through the first shaft TM.

As a result, a reduced speed output is delivered to the fifth rotation element N5 of the compound planetary gear set CPG, and the torque of the EV mode third speed is output through the output gear OG connected to the fifth rotation element N5 through the fifth shaft TM5.

Here, the engine mode (parallel hybrid mode) and the eCVT mode may be combined, such that a shifting mode having at least seven speeds may be realized as well as an engine mode having six fixed shift-stages.

As described above, a power transmission apparatus of a hybrid electric vehicle according to an exemplary form employs only two planetary gear sets PG1 and PG2, thereby simplifying the structure of a transmission. Furthermore, an engine mode and a parallel hybrid mode respectively having six speeds and an electronically-controlled continuously variable shifting mode (eCVT mode) may be combined to realize various shifting modes having more than six speeds, thereby reducing a production cost, and realizing fuel consumption characteristic and power performance above an equivalent transmission.

In addition, the number of employed planetary gear sets may be decreased compared to a conventional six-speed transmission, and therefore, an overall length may be decreased, thereby improving installability.

In addition, by controlling the first brake B1 through the dog clutch unit DC as an engagement unit, when the first brake B1 is released, a drag loss of the first brake B1 may be reduced or minimized by utilizing a neutral state of the dog clutch unit DC.

In addition, an eCVT mode having gear ratios appropriate for a low gear may be realized, and fuel consumption may be improved by using the eCVT mode when driving in a city-mode.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

IS: input shaft
OG: output gear
CPG: compound planetary gear set
MG: motor/generator
PG1, PG2: first and second planetary gear sets
B1, B2: first and second brakes
C1, C2: first and second clutches
TM1, TM2, TM3, TM4, TM5, TM6: first, second, third, fourth, fifth, and sixth shafts
DC: dog clutch unit

What is claimed is:

1. A power transmission apparatus for a hybrid electric vehicle having power sources of an engine and a motor/generator, the power transmission apparatus comprising:
    an input shaft configured to receive an engine torque;
    a compound planetary gear set formed by a combination of first and second planetary gear sets and including first, second, third, fourth, and fifth rotation elements;
    a first shaft fixedly connected to the first rotation element, fixedly connected to the motor/generator, and selectively connected to the input shaft;
    a second shaft fixedly connected to the second rotation element and selectively connected to the input shaft;
    a third shaft fixedly connected to the third rotation element and selectively connected to a transmission housing;
    a fourth shaft fixedly connected to the fourth rotation element;
    a fifth shaft fixedly connecting the fifth rotation element and an output gear;
    a sixth shaft selectively connected to the second shaft and the fourth shaft and selectively connected to the transmission housing;
    a plurality of engagement elements including at least one clutch and at least one brake; and
    an engagement unit selectively connecting the sixth shaft to the second shaft or the fourth shaft.

2. The power transmission apparatus of claim 1, wherein the first planetary gear set is formed as a single pinion planetary gear set and the second planetary gear set is formed as a double pinion planetary gear set.

3. The power transmission apparatus of claim 2, wherein the compound planetary gear set comprises:
    a first sun gear as the first rotation element;
    a common planet carrier as the second rotation element, wherein the first and second planetary gear sets are configured to share the common planet carrier;
    a first ring gear as the third rotation element;
    a second sun gear as the fourth rotation element; and
    a second ring gear as the fifth rotation element.

4. The power transmission apparatus of claim 1, wherein the plurality of engagement elements comprise:
    a first clutch arranged between the first shaft and the input shaft;
    a second clutch arranged between the second shaft and the input shaft;
    a first brake arranged between the sixth shaft and the transmission housing; and
    a second brake arranged between the third shaft and the transmission housing.

5. The power transmission apparatus of claim 1, wherein the engagement unit comprises a dog clutch unit.

6. The power transmission apparatus of claim 5, wherein the dog clutch unit comprises:
    a sixth shaft gear formed on an interior circumference of the sixth shaft;
    a second shaft gear formed on an exterior circumference of the second shaft;
    a fourth shaft gear formed on an exterior circumference of the fourth shaft; and
    a clutch gear including: an exterior circumference always engaged with the sixth shaft gear, and an interior circumference selectively engaged with the second shaft gear and the fourth shaft gear, such that the clutch gear selectively connects the sixth shaft to the second shaft or the fourth shaft.

7. The power transmission apparatus of claim 1, wherein the power transmission apparatus is configured to provide an engine mode and a parallel hybrid mode respectively having six fixed shift-stages, an electronically-controlled continuously variable shifting mode, and an electric vehicle mode having three fixed shift-stages.

* * * * *